July 22, 1958

E. J. BARNETT 2,844,701

HEATING APPARATUS

Filed Nov. 22, 1955

INVENTOR
EUGENE J. BARNETT

BY *M.C. Freudenberg*

ATTORNEY

July 22, 1958  E. J. BARNETT  2,844,701
HEATING APPARATUS

Filed Nov. 22, 1955  2 Sheets-Sheet 2

INVENTOR
EUGENE J. BARNETT
BY M. C. Freudenberg
ATTORNEY

United States Patent Office 2,844,701
Patented July 22, 1958

2,844,701

HEATING APPARATUS

Eugene J. Barnett, Mansfield, Ohio, assignor to Westinghouse Electric Corporation, East Pittsburgh, Pa., a corporation of Pennsylvania Application November 22, 1955, Serial No. 548,311

5 Claims. (Cl. 219—35)

This invention pertains to a sheathed electrical resistance heater for an oven.

It is an object of this invention to improve the heat distribution from a tubular sheathed electrical heater in an oven.

Another object of this invention is to obtain good heat distribution in an oven from a sheathed electrical heater having a shape that is economical to manufacture.

This invention is intended to accomplish the above objects in an oven having its greatest heat losses at the side thereof formed by the oven door.

In accordance with this invention, an electrical sheathed heater, formed in a loop, is placed parallel to and spaced a short distance from the bottom wall of a box-shaped oven. The front side of the heater loop extends along the oven door, where the heat losses are the greatest. A second and shorter side of the heater loop extends along the rear wall of the oven. The front side of the heater loop is closer to the door and to the side walls of the oven than is the shorter rear side of the heater with respect to the rear and side walls of the oven. The heater loop is completed by two straight sides that converge toward the rear of the oven. This heater configuration and location help maintain a more uniform temperature throughout the oven interior.

The foregoing and other objects are effected by the invention as will be apparent from the following description taken in connection with the accompanying drawings, forming a part of this application, in which.

Figure 1:
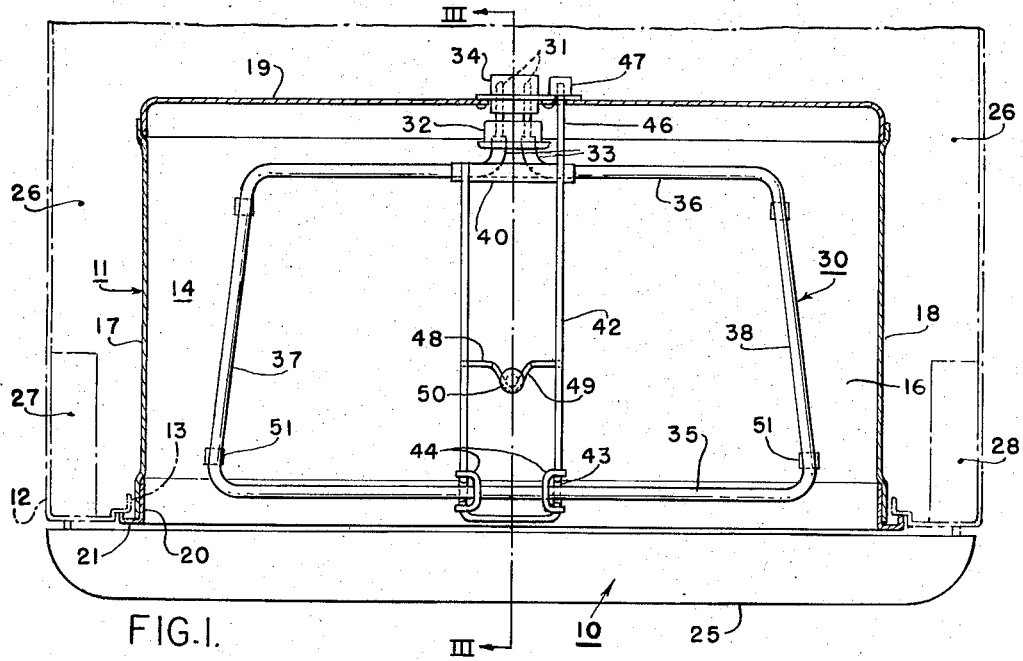
Fig. 1 is a horizontal section of an oven, showing a door closing the open front end of the oven, an oven heater in plan and an oven supporting frame in phantom.

Referring to Fig. 1, an oven 10 comprises an open front rectangular box-shaped liner 11 supported within a frame 12. The frame 12 (shown in phantom) has an opening 13 within which lies the open front end of the liner 11, the rear portion of the liner 11 being supported from the frame 12 in any suitable manner (not illustrated). The liner 11 is formed by a sheet metal wrapper 14 bent to form its top wall 15, bottom wall 16 and side walls 17 and 18, respectively. A shallow metal pan 19 is attached to the wrapper 14 to form the rear liner wall. A throat member 20 extends into the front end of the wrapper 14 and has an outwardly-extending flange 21 that engages the front of the frame 12 to help position the liner 11. A door 25 forming a closure for the liner 11 is pivotally supported adjacent its lower edge by the frame 12. The door 25 and the space 26 within the frame surrounding the liner 11 are filled with any suitable heat insulating material (not shown) to impede the loss of heat from within the oven liner 11.

At the sides of the liner, adjacent the lower front portions thereof, the spaces 27 and 28 are devoid of insulating material as they house some suitable counterbalancing mechanisms (not shown) for supporting the door.

A sheathed electrical resistance heater 30 in the form of a large loop is supported near the horizontal bottom wall 16 of the liner 11 in a plane parallel thereto. The heater comprises a tubuar metal sheath through which a coiled resistance element extends. The sheath contains a suitable insulating material to electrically insulate the resistance element therefrom. Details of the resistance element and the insulating material are omitted as they are well known in the electrical heating art. Electrical connections to the resistance element within the heater 30 are made through a pair of male terminals 31 extending rearwardly from an insulating terminal block 32 attached to the ends 33 of the heater sheath at the rear of the heater 30. These male terminals 31 plug into a receptacle 34 that is attached to the rear wall 19 of the liner 11 and contains connections to a suitable power source.

The sheathed heater 30 as seen in Fig. 1 resembles an isosceles trapezoid with the front portion 35 and the rear portion 36 forming parallel sides of the heater loop. The front portion 35 is longer than the rear portion 36. The heater sides 37 and 38 are of equal length, straight and non-parallel and connect the transversely extending front and rear heater portions 35 and 36, converging along their entire length toward the latter and the rear of the liner 11. The distance between the front heater portion 35 and the oven door 25 is less than the distance from the rear heater portion 36 to the rear wall 19 of the liner 11 to provide a greater supply of heat along the front of the oven as will be explained hereinafter. The heat distribution pattern of heater 30 is symmetrical about the front-to-rear vertical center plane of the oven liner.

Figure 3:
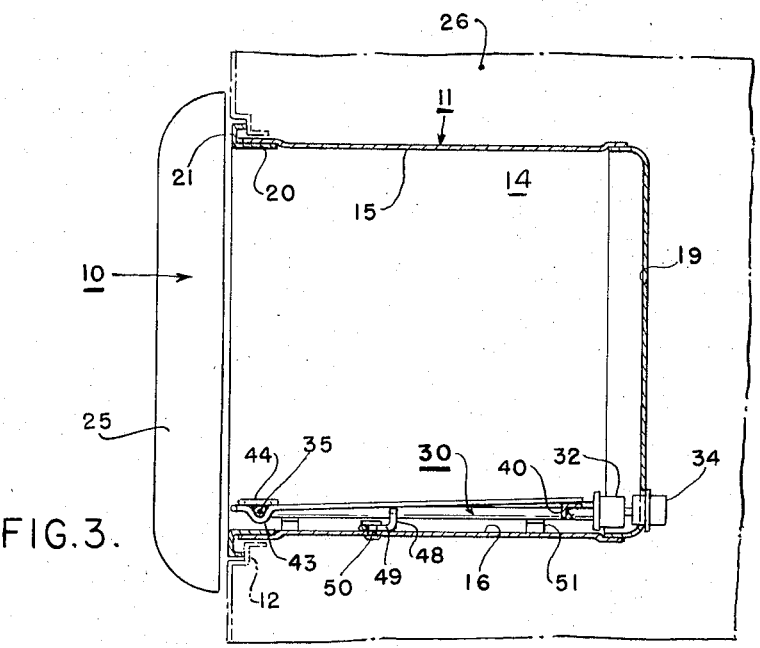
Fig. 3 is a vertical section taken on line III—III of Fig. 1.

The ends 33 of the heater are bridged by a metal reinforcing bar 40 of L-section welded to the sheath of the heater 30. Attached to the bar is a U-shaped wire member 42 that serves as a handle for plugging in and unplugging the heater 30 and also provides means for supporting part of the heater. The legs of the U-shaped member are indented, as seen at 43 in Fig. 3, to receive the heater. Wire bridging pieces 44 welded to the U-shaped member 42 retain the heater loosely in the indentations 43. One leg 46 of the U-shaped member 42 extends rearwardly beyond the bar 40 and into an electrical grounding receptacle 47, attached to the rear liner wall 19 so that the sheath of the heater 30 and the handle member 42 will always be electrically safe to touch. Extending between the legs of the U-shaped member 42 and welded thereto is a wire support 48. The support 48 has a V-shaped portion 49 resting on the bottom wall of the liner. This V-shaped portion 49 opens toward the rear of the oven and straddles a pin 50 fixed on the bottom wall 16 of the liner to centrally locate the heater 30 with respect to the sides 17 and 18 of the oven. A plurality of L-shaped lugs 51 welded to the heater sheath, together with the plug-in terminals 31 and the U-shaped member 42, support the heater spaced from the bottom wall 16 of the liner 11. The lugs 51 slide freely on the bottom wall of the liner to permit unrestricted expansion and contraction of the heater 30 during heating and cooling.

Sheathed heaters of the type referred to above are manufactured by filling the sheath with the resistance element and insulating material before the sheath is bent to its desired configuration. The resistance element has uniform resistance per unit length to provide a uniform heat output per unit length along the heater. The available materials that are suitable for use in mass production of these heaters at low cost limit the maximum wattage density along the heater. Thus for a given wattage there is usually a minimum practical length for such a sheathed heater. The total cost of a sheathed heater is dependent in part on the amount of bending necessary to give it its final shape. The simplest bends involve a minimum cost for the labor and tools to make them.

The isosceles trapezoid configuration of the heater 30 keeps the cost of bending it at a minimum, since there are only six bends in the sheath and the bent portions of the sheath are a relatively small portion of its total length. The configuration just set forth provides a relatively long heater with relatively low wattage density and with a minimum amount of bending whereby a desirable heat distribution pattern and more uniform temperatures throughout the interior of the oven 10 are maintained.

For a further explanation as to why the heater shape described herein is most suitable for an oven having its greatest heat losses around the door, reference will again be made to Fig. 1. An ideal condition of heat distribution would be that which would maintain the same temperature in all parts of the oven interior.

The heat losses from the oven are greatest around the oven opening due to the lesser amount of thermal insulation in the spaces 27 and 28, the conduction of heat from the open end of the liner 11 to the frame 12, and the heat losses through the door 25 and between the door 25 and the frame 12. The door of an oven usually does not have the thickness of thermal insulating material that is present in the other oven walls. Oven doors usually are not uniformly and effectively insulated throughout their expanse, due to displacement of the insulating material by structural members needed within the doors to give them rigidity and to provide for their support from the oven frame.

Since the heat losses are greatest around the front of the oven, the heater 30 is arranged so that the front portion 35 extends near the door 25 and side walls 17 and 18 of the oven to supply additional heat to the heat sinks that account for these greater losses. Note that the forward corners of the heater form acute angles that extend closer to both the sides 17 and 18 of the liner and to the door 25 than do the rear obtuse-angle corners with respect to the liner sides 17 and 18 and the rear liner wall 19, respectively. By supplying the heat losses to these heat sinks directly from the heater, there is a minimum flow of heat to these sinks from other parts of the oven. The heater shape described above not only supplies enough additional heat at the front of the oven to maintain the average temperature inside the front of the oven substantially the same as the temperature in the rear of the oven, but it also maintains a more uniform temperature around the interior of the oven.

Figure 2:
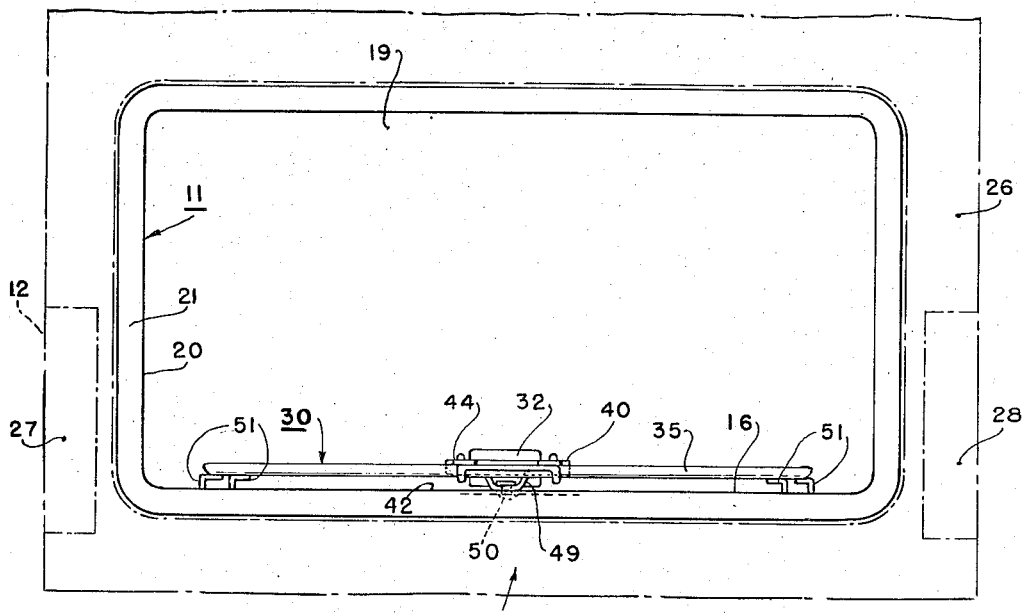
Fig. 2 is a front view of the oven of Fig. 1 without the door.
Figure 4:
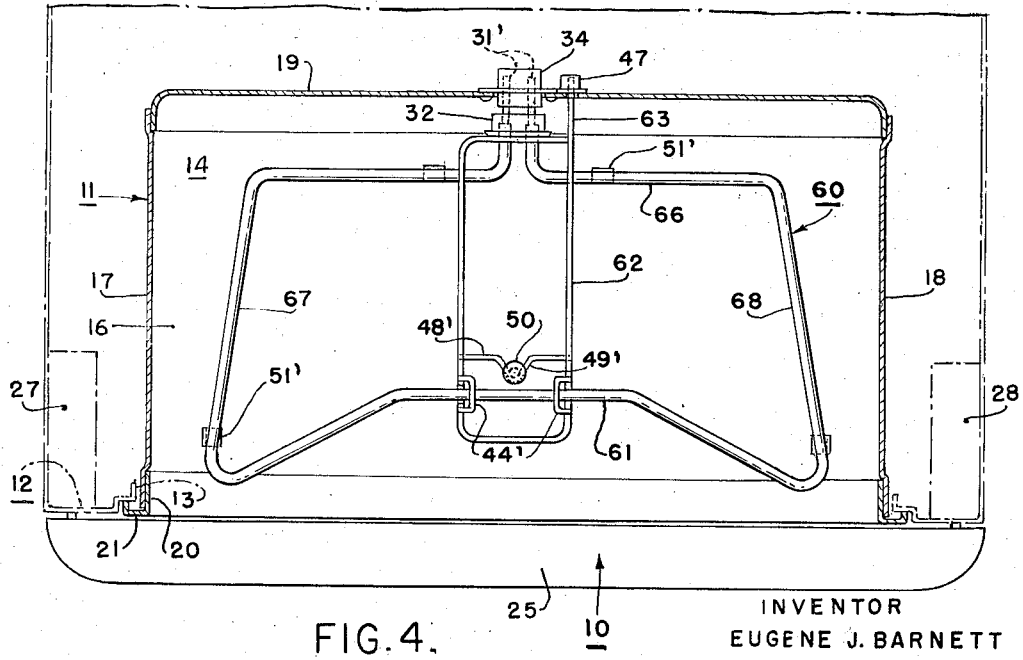
Fig. 4 is a section similar to Fig. 1, but showing another embodiment of the oven heater in plan.

Referring to Fig. 4, a sheathed heater 60 has a configuration somewhat similar to heater 30 described above, but the front portion 61 of the heater 60 is bowed away from the oven door 25. All parts of the oven construction of Fig. 4, except for the heater, are the same and bear the same reference numerals as those shown in Figs. 1 through 3. The parts of the heater that are identical with those of Figs. 1 through 3 bear like reference numerals with a prime notation.

A wire member 62 bent in a loop serves as a handle and positioning member for the heater 60. The wire member 62 and the front portion 61 of the heater are fastened together in the same manner as are the heater portion 35 and wire member 42 of Figs. 1 through 3. At the rear of the heater a portion of the wire loop 62 bridges the ends of the heater sheath and is welded thereto. A rearward extension 63 of wire loop 62 is electrically grounded within the receptacle 47 on the rear of the oven liner 11.

The rear portion 66 and the sides 67 and 68 of the heater 60 have substantially the same shape and location relative the rear wall 19 and side walls 17 and 18 of the oven liner 11 as the corresponding heater portions 36, 37 and 38 of the heater 30. The electrical connections to heaters 30 and 60 are identical.

The front portion 61 of the heater extending along the door 25 is bowed so as to be spaced farther from the door 25 at the front center of the oven. This increased spacing between the door 25 and the middle of the front heater portion 61 reduces the amount of heat picked up by the door due to direct radiation from the heater. Although the front central portion of the heater 60 is farther from the door 25, the total heat supplied near the front of the oven is sufficient to overcome the greater heat losses around the door 25. The bowed side 61 of the heater 60 is greater in length than the straight side 35 of heater 30 and is thus able to provide more heat at the front of the oven. The bowing of the front of the heater as shown in Fig. 4 also provides some additional heat to the center of the oven to maintain more uniform temperatures throughout the oven interior.

While I have shown my invention in several forms, it will be obvious to those skilled in the art that it is not so limited, but is susceptible of various other changes and modifications without departing from the spirit thereof.

What I claim is:

1. A sheathed electrical resistance heater for an oven that is rectangular in horizontal cross section and has greater heat losses along the front side thereof, said heater having a tubular sheath forming a planar loop having a pair of straight sides, said sides being joined by transversely extending front and rear heater portions, said front portion being longer than said rear portion, said sides converging toward said rear portion, said heater having uniform resistance per unit length to provide uniform heat output per unit length around said loop when energized, an electrical connector attached to said rear heater portion, said heater providing a heating pattern symmetrical about a plane extending normal to said loop centrally from the front to the rear thereof, said heater providing more heat along the front of the oven to help maintain a uniform temperature throughout the oven when the heater is placed near the bottom thereof with the front heater portion positioned along the front of the oven, said heater having means for supporting it spaced above the bottom wall of said oven.

2. A sheathed electrical resistance heater for an oven that is rectangular in horizontal cross section and has greater heat losses along the front side thereof, said heater having a tubular sheath forming a planar loop having a pair of straight sides, said sides being joined by transversely extending front and rear heater portions, said front portion being longer than said rear portion, said rear heater portion being straight and forming the same angle with respect to each of said straight heater sides, said sides converging toward said rear portion, said heater having uniform resistance per unit length to provide uniform heat output per unit length around said loop when energized, an electrical connector attached to said rear heater portion, said heater providing a heating pattern symmetrical about a plane extending normal to said loop centrally from the front to the rear thereof, said heater providing more heat along the front of the oven to help maintain a uniform temperature throughout the oven when the heater is placed near the bottom thereof with the front heater portion positioned along the front of the oven, said heater having means for supporting it spaced above the bottom wall of said oven.

3. A sheathed electrical resistance heater for an oven that is rectangular in horizontal cross section and has greater heat losses along the front side thereof, said heater having a tubular sheath forming a planar loop having a pair of straight sides, said sides being joined by transversely extending front and rear heater portions, said front portion being longer than said rear portion, said front and rear heater portions being straight and parallel, the heater loop having the shape of an isosceles trapezoid, said sides converging toward said rear portion, said heater having uniform resistance per unit length to provide uniform heat output per unit length around said loop when energized, an electrical connector attached to said rear heater portion, said heater providing a heating pattern symmetrical about a plane extending normal to said loop centrally from the front to the rear thereof, said heater providing more heat along the front of the oven to help maintain a uniform temperature throughout the oven when the heater is placed near the bottom thereof with the front heater portion positioned along the front of the oven, said heater having means for supporting it spaced above the bottom wall of said oven.

4. A sheathed electrical resistance heater for an oven that is rectangular in horizontal cross section and has greater heat losses along the front side thereof, said heater having a tubular sheath forming a planar loop having a pair of sides, said sides being joined by transversely extending front and rear heater portions, said front portion being longer than said rear portion, said sides converging toward said rear portion, said heater having uniform resistance per unit length to provide uniform heat output per unit length around said loop when energized, and an electrical connector attached to said heater at said rear portion, the front corners of said heater loop formed by the junctions of said front portion and said sides forming acute angles, said front heater corners being more widely spaced than the rear heater corners formed by the junction of said rear portion and said sides to help maintain a more uniform temperature throughout said oven when said heater is placed near the bottom thereof but spaced therefrom and said front heater portion is positioned along the front of the oven.

5. A sheathed electrical resistance heater for an oven that is rectangular in horizontal cross section and has greater heat losses along one of its vertical sides, said heater forming a planar loop having a pair of sides, said sides being joined at their ends by transversely extending front and rear heater portions, said front portion being longer than said rear portion, said sides converging along their entire length toward said rear portion, said heater having a uniform heat output per unit length around said loop when energized, an electrical connector attached to said rear heater portion, said heater providing a heating pattern to help maintain a more uniform temperature throughout said oven when said heater is positioned in the bottom of said oven with said front heater portion extending along said one of said vertical sides, said heater having means for supporting it spaced from the bottom wall of said oven.

References Cited in the file of this patent

UNITED STATES PATENTS

| | | |
|---|---|---|
| 1,359,400 | Lightfoot | Nov. 16, 1920 |
| 1,555,542 | Young | Sept. 29, 1925 |
| 1,982,386 | Heinbuch | Nov. 27, 1934 |
| 2,180,600 | Mills | Nov. 21, 1939 |
| 2,221,595 | Lockwood | Nov. 12, 1940 |
| 2,622,181 | Sheidler | Dec. 16, 1952 |

FOREIGN PATENTS

| | | |
|---|---|---|
| 51,804 | Norway | Nov. 21, 1932 |